Mar. 13, 1923.
J. JOHNSON
1,448,120
FISHING ROD
Filed Aug. 29, 1922
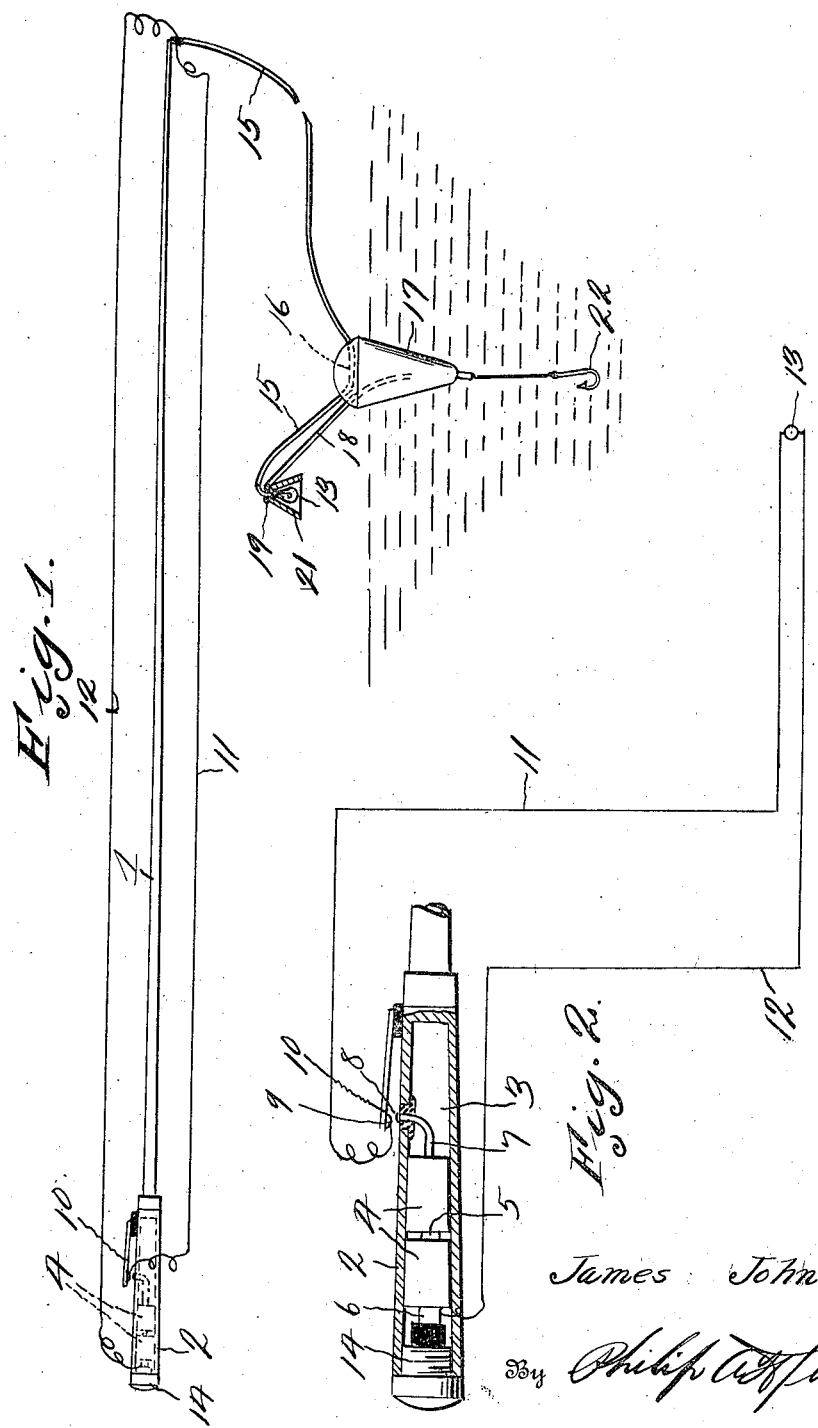
Inventor
James Johnson
By Philip A. Ferrell
Attorney Patented Mar. 13, 1923.

1,448,120

UNITED STATES PATENT OFFICE.

JAMES JOHNSON, OF FREMONT, NEBRASKA.

FISHING ROD.

Application filed August 29, 1922. Serial No. 585,075.

*To all whom it may concern:*

Be it known that JAMES JOHNSON, citizen of the United States, residing at Fremont, in the county of Dodge and State of Nebraska, has invented certain new and useful Improvements in Fishing Rods, of which the following is a specification, reference being had therein to the accompanying drawings.

The invention relates to fishing rods, and has for its object to provide a fishing rod, in the handle of which electric batteries are disposed, said batteries being in circuit with an electric light disposed on a fishing bob or float and forming means whereby fish will be attracted. Also to provide the light with a reflector whereby rays of light will be directed downwardly adjacent the fishing bob.

A further object is to provide the fishing bob with an angularly disposed bracket for supporting the light and reflector, the bracket being at a right angle to the wires leading to the float thereby counterbalancing the same.

With the above and other objects in view the invention resides in the combination and arrangement parts as hereinafter set forth, shown in the drawing, described and claimed, it being understood that changes in the precise embodiment of the invention may be made within the scope of what is claimed without departing from the spirit of the invention.

In the drawing:—

Figure 1 is a side elevation of the fishing rod and float, showing the device applied thereto.

Figure 2 is a longitudinal sectional view through the fishing rod handle, showing the battery and the electric circuit.

Referring to the drawing, the numeral 1 designates the fishing rod and 2 the handle thereof. Disposed within the chamber 3 of the handle are electric batteries 4, which are in circuit with each other through the contact member 5, and with the conductor lug 6. The inner battery 4 engages the conductor arm 7, which extends through the wall of the handle 2 and terminates in a contact end 8, with which the contact 9 of the switch 10 cooperates in such a manner that when the contact members 9 and 8 are in engagement with each other the electric circuit is closed and electric energy passes over the wires 11 and the wire 12 which is in circuit with the lug 6, thereby causing an electric lamp 13 to be lighted. The batteries 4 are held in the chamber 3 by means of the screw plug 14 which carries the lug 6. Wires 11 and 12 may pass through the rod 1 if so desired, however for purposes of clearness they are shown on diametrically opposite sides thereof and they pass through an insulating water proof sleeve 15 and thence through a transversely disposed aperture 16 in the upper end of the float 17, entering said aperture at an angle of about forty-five degrees. Extending upwardly and at an angle of about ninety degrees to the cable 15 adjacent its lower end and from the upper end of the float 17 is a bracket 18, which bracket terminates in a horizontal disposed ear 19, which supports an electric lamp 13 and a reflector 21. The weight of the lamp, the reflector and the bracket 18 counterbalances the float 17 against the action of the sleeve 15 and the wires 11 and 12, therein, thereby maintaining the float 17 in a substantial vertical position as shown in Figure 1. The reflector 21 directs the rays of light downwardly for attracting fish to a point adjacent the fishing hook 22.

From the above it will be seen that illuminating means is provided in connection with a fishing rod and float which is simple in construction, the batteries encased within the handle of the fishing rod and the light and reflector supported on the float in such a manner that the float will not tilt, and the light will be maintained out of the water. The light is preferably provided with water tight connections whereby it will not short circuit if immersed in water.

The invention having been set forth what is claimed as new and useful is:—

The combination with a fishing rod, a fishing float, of an electric light carried by said float, said light being supported on an outwardly and upwardly extending bracket, a reflector carried by said light and bracket, batteries carried by the fishing pole adjacent the handle, electric wires connected to said batteries and in circuit therewith, a switch in said circuit, said wires forming a connection between the outer end of the rod and the float and extending downwardly and inwardly to the float at the opposite side from the light supporting bracket.

In testimony whereof I hereunto affix my signature.

JAMES JOHNSON.